United States Patent Office 2,796,192
Patented June 18, 1957

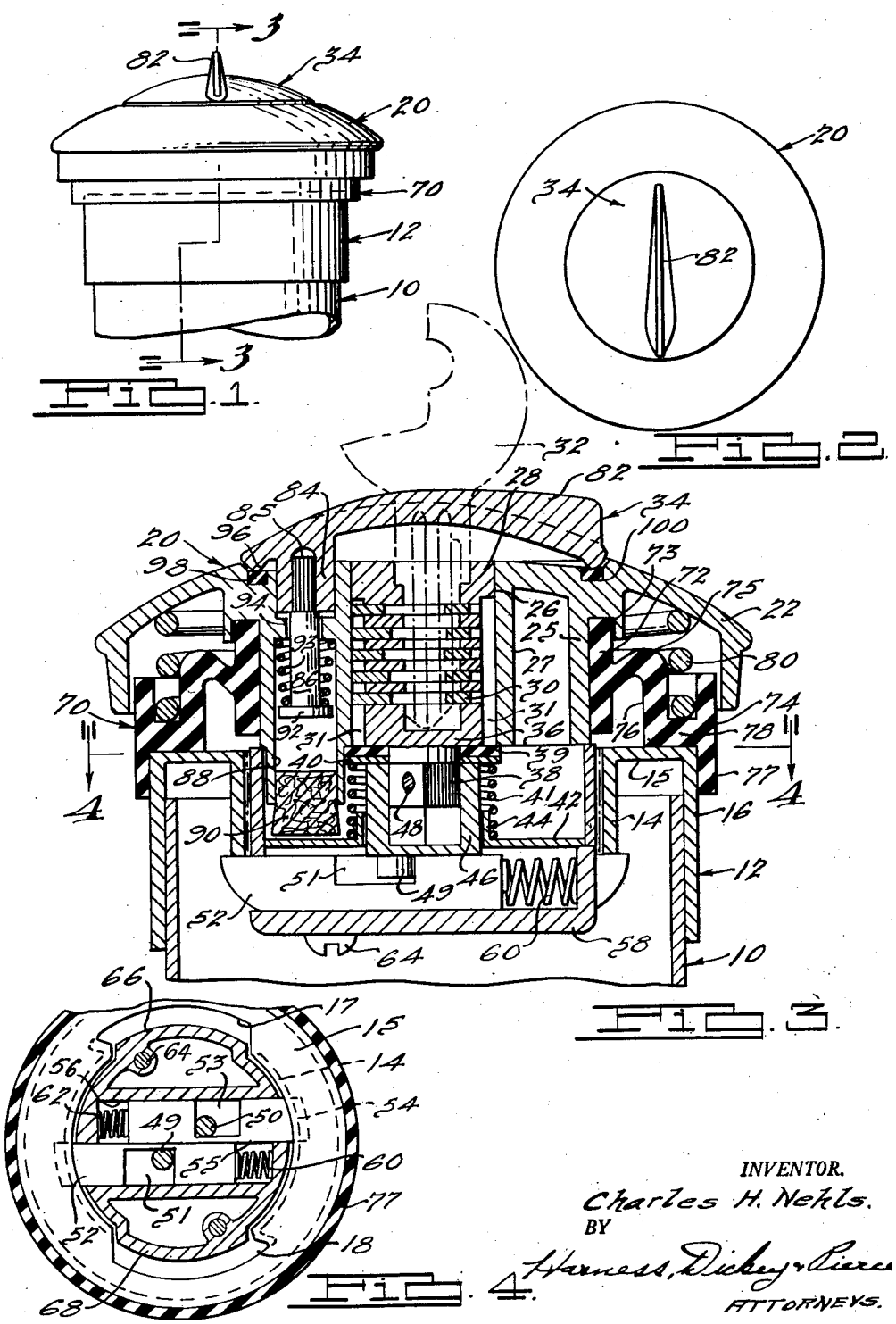

2,796,192

LOCKING CLOSURE

Charles H. Nehls, Detroit, Mich.

Application December 29, 1952, Serial No. 328,283

6 Claims. (Cl. 220—46)

This invention relates to removable and replaceable cap type closures for tanks and other receptacles and, more particularly, to an improved locking cap adapted for use in sealing the filler neck of an automobile fuel tank or the like.

An object of the invention is to overcome disadvantages inherent in conventional locking closures of the above mentioned type and to provide an improved locking cap incorporating a locking mechanism designed for key release which effectively prevents unauthorized removal of such cap and which is particularly adapted to prevent the escape of fuel through the keyhole.

Another object of the invention is to provide an improved locking cap incorporating an improved retaining element which functions to retain the locking mechanism provided in the cap and also functions as an effective seal to prevent the escape of fuel around the locking mechanism.

Another object of the invention is to provide an improved locking cap having a small number of parts which are rugged in construction and which may be easily and economically assembled with a minimum of labor and expense.

Still another object of the invention is to provide an improved locking cap that is economical of manufacture, durable, efficient, pleasing in appearance and anti-rattling in construction, as well as weather-resistant.

With the above as well as other and in certain cases more detailed objects in view which will become apparent from the following description and the appended claims, a preferred embodiment of the invention is shown in the accompanying drawing, throughout the several views of which corresponding reference characters designate corresponding parts and wherein:

Figure 1 is an elevational view of a locking cap constructed in accordance with the present invention, showing the same installed on a fragmentarily illustrated filler neck such as that conventionally provided on an automotive vehicle fuel tank;

Fig. 2 is a top plan view of the invention shown in Fig. 1;

Fig. 3 is a diametric sectional view on an enlarged scale, taken substantially on the line 3—3 of Fig. 1 and looking in the direction of the arrows; and Fig. 4 is a horizontal sectional plan view partly broken away, taken substantially on the line 4—4 of Fig. 3 and looking in the direction of the arrows.

Referring to the drawing, a neck of a receptacle is shown, generally designated 10, which may be considered to be the filler neck of the fuel tank of a motor vehicle, although it will be understood that the invention is applicable to other uses. The neck is shown as provided at its outer end with a return bent, substantially U-sectioned finishing ring 12, the flanges 14 and 16 of which extend parallel with the neck while the web portion 15 extends inwardly. The flange 14 and web 15 are partially cut away at diametrically opposite positions, as indicated at 17 and 18. Such cut away portions have inclined, downturned margins and are of a form commonly provided on automotive vehicle fuel tank filler necks to permit the application of a cap of the bayonet locking type, although the cap of the present invention is not of the bayonet locking type, such neck construction being merely shown in order to illustrate the applicability of my improved cap thereto.

The cap incorporates a body portion, generally designated 20, which may be formed as a die casting and which is provided with a downwardly extending skirt portion 22 spacedly overhanging the neck. In the preferred construction shown, the outer surface is relatively smooth although such surface may be configured or altered in shape to suit the wishes of the designer.

A centrally disposed portion 25 is formed integrally with the body and extends downwardly therefrom. A lock cylinder 26 is provided in such central portion adapted to accommodate a plug 28 and a concentric groove 27 may also be provided in such centrally disposed portion extending partially therearound so as to reduce the weight of the cap. The plug 28 includes conventional spring biased plate tumblers 30 which normally project into diametrically opposed longitudinally extending grooves 31 formed in the inner wall of the cylinder. The tumblers 30 have apertures therein through which a key 32 passes to retract the tumblers from the grooves 31 after which the plug is rotatable in the cylinder 26 through the agency of the key 32 in the conventional manner. The upper key-receiving end of the plug is exposed but is adapted to be covered by a dust cover, generally designated 34, the construction of which will hereinafter be considered in greater detail.

It is a feature of the present invention that the lower end portion of the plug 28 extends downwardly beyond the end of the key and is closed by a bottom wall 36 which prevents the passage of fuel through the keyhole. An integral, rectangular or non-circular lug 38 extends downwardly from the lower surface of the bottom wall 36 and a ring-shaped sealing member 39, formed of a soft, rubber-like material, preferably of a synthetic character which will not be affected by the fuel or other material stored in the tank, is fitted over the lug 38 so that the inner portion of the sealing member 39 bears against the lower surface of the end wall 36 while the outer portion bears against the end of the downwardly extending portion 25 of the cap. Pressure is applied to the sealing member 39 by a similarly shaped washer 40, biased by a coil spring 41. The lower end of the spring 41 bears against a plate 42 having a hub portion 44 in which is fitted a cap 46. Such a construction prevents the escape of fuel through the cylinder 26 along the periphery of the plug and also functions to retain the plug in the cylinder.

The lug 38 projects into a similarly shaped recessed portion provided in the cap 46 and is retained therein by a pin 48 which extends through the lug and the walls of the cap 46. At its lower end, the cap 46 is provided with a pair of projecting pins 49 and 50. Pin 49 projects into an actuating notch 51 in a latch bolt 52, while the pin 50 projects into a similar notch 53 in a latch bolt 54. The latch bolts are slidable in slideways 55 and 56 respectively, formed in a housing 58 and are urged outwardly in opposite directions by compression springs 60 and 62 respectively, which normally project the bolts to positions in which they extend outwardly through suitable openings provided in the sides of the housing and underlie the filler neck flange portion 14 to prevent removal of the cap. The latch bolts are simultaneously retractable to permit removal of the cap in response to the rotation of the plug 28. The housing 58 is secured to the downwardly extending body portions 25 of the cap by screws, such as 64, the housing 58 and body portion 25 complementing one another to form a substantially cylindrical downwardly extending central section which projects into the filler neck. The housing is also provided with radially projecting side portions 66 and 68 adapted to extend into the cutout areas 17 and 18. The projecting portions 66 and 68 key the cap against rotating with respect to the filler neck and assure proper positioning of the cap upon the filler neck in such manner that the bolts will engage the portions of the flange 14 between the cut out areas 17 and 18.

A sealing member, generally designated 70, is housed in the skirt portion and serves to prevent the escape of fuel around the periphery of the cap. The sealing member 70 is formed of rubber-like material, preferably of a synthetic character, which will be unaffected by the fuel or material to be stored in the tank and is of the cross-sectional contour illustrated in Fig. 3.

The sealing member includes a pair of concentrically disposed sleeves 72 and 74 integrally joined by a stepped web portion 75. The sleeve 72 snugly fits the downwardly extending, centrally disposed portion 25 of the cap, while the upper end of the sleeve 72 is fitted in a groove formed in the upper portion of the cap 20 concentrically with the centrally disposed portion 25. The lower portion 77 of the outer sleeve 74 is adapted to bear against the outer surface of the finishing ring 12 while the lower surface of the step 78 is adapted to bear against the web portion 15 of the finishing ring. The lower end of a coiled spring 80 is fitted in the channel defined by the riser portion 76 and the upper portion of the outer sleeve 74, the lower end portion of such spring bearing against the inner surface of the step 78 while the distal end of the spring bears against the inner surface of the skirt 22.

When the cap is positioned downwardly on the filler neck far enough to cause the latch bolts 52 and 54 to engage the neck flange 14, the vertical compressive force exerted on the sealing member 70 causes the step portion 79 to deflect upwardly while the lower portion 77 of the sleeve 74 and the lower surface of the step 78 engage the finishing ring to form a seal therebetween.

The dust cover 34 for the plug 28 may be formed as a die casting and is provided with an upwardly extending rib portion 82 which serves as a handle for manually opening and closing the dust cover. The cover is provided with a downwardly extending pad 84 on one side thereof and a passageway 85 is formed in the pad 84 adapted to receive a vertically extending pivot pin 86 which extends downwardly in a vertically extending bore 88 provided in the central portion of the cap, the lower end portion of the bore being sealed by a plug 90 which may be formed of cork or other suitable material. The upper end portion of the pivot pin is keyed or otherwise fixed to the dust cover, while the lower end portion is upset or otherwise enlarged to form a collar 92 which serves to retain a coiled spring 93 disposed around the lower end portion of the pivot pin. The upper end portion of the coiled spring abuts the lower surface of an integral rib or shoulder 94 formed in the bore 88 at a position near, but spaced from, the upper end thereof.

For the purpose of sealing the cover on the body portion 20, an integral downwardly extending rim 96 is provided around the periphery of the dust cover and is adapted to engage a ring gasket 98 mounted in a groove 100 provided in the upper surface of the body portion.

When the dust cover is closed the outer rim portion 96 of the cover bears downwardly against the gasket and the force exerted by the spring 93 upon the pivot pin 86 forces the rim downwardly into intimate contact with the gasket 98 so as to effectively seal the plug 28 from contact with dust, dirt, and other foreign substances.

The dust cover may be opened by exerting lateral pressure on the upwardly extending rib portion 82 thereof so that the cam action of the rim 96 raises the dust cover above the surface of the body portion 20 and compresses the spring 93 against the internal shoulder 94 so as to raise the pivot pin 86 in the downwardly extending bore 88.

While a preferred embodiment of the invention has been shown and described, it will be understood that various changes and modifications may be made without departing from the spirit and scope of the invention.

What is claimed is:

1. A cap construction for filler necks and the like comprising a body member provided with a centrally disposed downwardly extending portion having a lock cylinder therein, a key-receiving plug operatively fitted in said cylinder, means closing the lower end portion of said plug and said cylinder, means including a bolt operable in response to the rotation of said plug for releasably holding said cap in a filler neck, a resilient sealing member, said sealing member including a pair of concentrically disposed sleeves joined by a stepped web portion, the inner sleeve snugly fitting said centrally disposed portion, the outer sleeve and the lower step of said web portion adapted to bear against the outer surface and end, respectively, of a filler neck to prevent the passage of fluid therebetween when said body member is positioned downwardly on the filler neck sufficiently to engage said bolt.

2. A locking cap for filler necks and the like including, in combination, a body member provided with a centrally disposed downwardly extending portion having a lock cylinder therein, a key-receiving plug closed at the lower end thereof and operatively fitted in said lock cylinder, means forming a fluid-tight seal between said plug and said centrally disposed portion adjacent the lower end of said cylinder, means including a bolt operable in response to the rotation of said plug for releasably holding said cap in a filler neck, a resilient sealing member, said sealing member including a pair of concentrically disposed sleeves integrally joined by a stepped web portion, the inner sleeve snugly fitting said centrally disposed portion, the outer sleeve and the lower step of said web portion adapted to bear against the outer surface and end, respectively, of a filler neck to prevent the flow of fluid therebetween when said body member is positioned downwardly on the filler neck sufficiently to engage said bolt.

3. A locking cap for filler necks and the like including, in combination, a body member provided with a centrally disposed downwardly extending portion having a lock cylinder therein, a key-receiving plug closed at the lower end thereof and operatively fitted in said lock cylinder, said plug provided with an axially projecting reduced portion on the lower end thereof, a cap member secured to said reduced portion of said plug, a first resilient sealing member fitted on said reduced portion intermediate said cap member and said centrally disposed portion of said body member, said cap member and said first sealing member co-acting to retain said plug in said cylinder and sealing said cylinder so as to prevent the passage of fluid therethrough, means maintaining said sealing member in fluid-sealing relationship with respect to said plug and said centrally disposed portion, means including a bolt operable in response to the rotation of said plug for releasably holding said cap in a filler neck, a second resilient sealing member, said second sealing member including a pair of concentrically disposed sleeves integrally joined by a stepped web portion, the inner sleeve snugly fitting said centrally disposed portion, the outer sleeve and the lower step of said web portion adapted to bear against the outer surface and end, respectively, of a filler neck to seal the end portion thereof when said body member is positioned downwardly on the filler neck sufficiently to engage said bolt.

4. A cap construction for filler necks and the like comprising a body member provided with a centrally disposed downwardly extending portion having a lock cylinder therein, a key-receiving plug operatively fitted in said cylinder, means closing the lower end portion of said plug and said cylinder, means including a bolt operable in respect to the rotation of said plug for releasably holding said cap in a filler neck, a spring biased resilient sealing member, said sealing member including a pair of concentrically disposed sleeves joined by a stepped web portion, the inner sleeve snugly fitting said centrally disposed portion, the outer sleeve and the lower step of said web portion adapted to bear against the outer surface and end respectively of a filler neck so as to seal the end portion thereof when said body member is positioned downwardly on the filler neck sufficiently to engage said bolt.

5. A locking cap for filler necks and the like including, in combination, a body member provided with a centrally disposed downwardly extending portion having a lock cylinder therein, a key-receiving plug closed at the lower end thereof and operatively fitted in said lock cylinder, said plug provided with an axially projecting reduced portion on the lower end thereof, a cap member secured to said reduced portion of said plug, a first spring biased resilient sealing member fitted on said reduced portion intermediate said cap member and said centrally disposed portion of said body member, said cap member and said first sealing means co-acting to retain said plug in said cylinder and sealing said cylinder so as to prevent the passage of fluid therethrough, resilient means maintaining said first sealing member in fluid sealing relationship with respect to said plug and said centrally disposed portion of said body member, means including a bolt operable in response to the rotation of said plug for releasably holding said cap in a filler neck, a second spring biased resilient sealing member, said second sealing member including a pair of concentrically disposed sleeves integrally joined by a stepped web portion, the inner sleeve snugly fitting said centrally disposed portion, the outer sleeve and the lower step of said web portion adapted to bear against the outer surface and end, respectively, of a filler neck to seal the end portion thereof when said body member is positioned downwardly on the filler neck sufficiently to engage said bolt.

6. A locking cap for filler necks and the like comprising, in combination, a body member having a downwardly extending skirt adapted to spacedly overhang a filler neck, said body member also provided with an integral downwardly extending centrally disposed portion having a lock cylinder formed therein, a key-receiving plug closed at the lower end thereof and operatively fitted in said cylinder, said plug provided with an integral axially projecting reduced portion on the lower end thereof, a cap member secured to said reduced portion of said plug, a first spring biased resilient sealing member fitted on said reduced portion intermediate said cap member and said centrally disposed portion of said body member, said cap member and said first sealing member coacting with said plug and said centrally disposed portion to retain said plug in said cylinder and sealing said cylinder so as to prevent the passage of fluid therethrough, means maintaining said sealing member in fluid-sealing relationship with respect to said plug and said centrally disposed portion, means including a pair of bolts operable in response to the rotation of said plug for releasably holding said cap in a filler neck, a second spring biased resilient sealing member, said second sealing member including a pair of concentrically disposed sleeves integrally joined by a stepped web having a pair of spaced, transversely extending portions joined by a riser portion, the inner sleeve snugly fitting said centrally disposed portion, the upper transversely extending portion adapted to deflect upwardly and the outer sleeve and the lower transversely extending portion adapted to bear against the outer surface and end, respectively, of a filler neck to seal the end portion thereof when said body member is positioned downwardly on the filler neck.

References Cited in the file of this patent

UNITED STATES PATENTS

| | | |
|---|---|---|
| 1,727,476 | Malluk | Sept. 10, 1929 |
| 1,885,547 | Rider | Nov. 1, 1932 |
| 1,988,044 | Moran | Jan. 15, 1935 |
| 2,154,118 | Ames | Apr. 11, 1939 |
| 2,263,653 | Smith et al. | Nov. 25, 1941 |
| 2,309,785 | Porter | Feb. 2, 1943 |
| 2,406,464 | Katz | Aug. 27, 1946 |
| 2,542,420 | Malouf | Feb. 20, 1951 |

FOREIGN PATENTS

| | | |
|---|---|---|
| 562,395 | Great Britain | June 29, 1944 |